March 22, 1932. T. W. MILNER 1,850,599
SERVICE TRAY
Filed Dec. 12, 1928
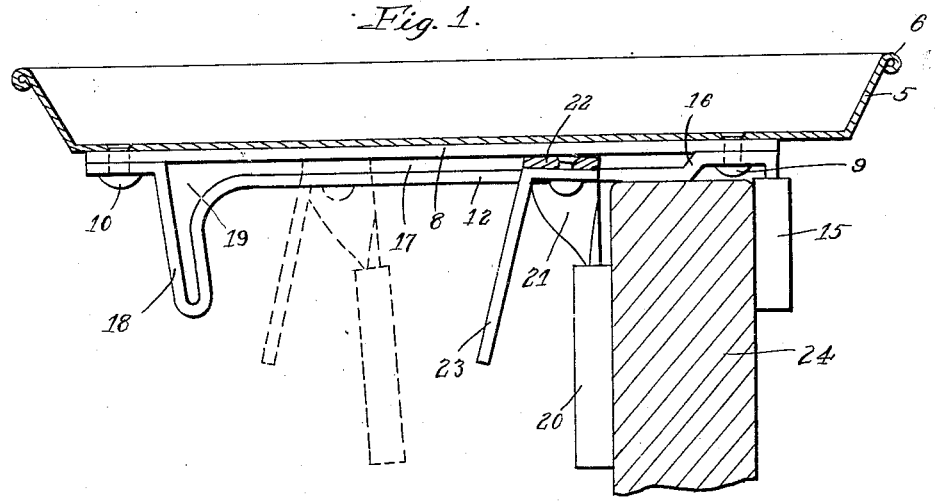
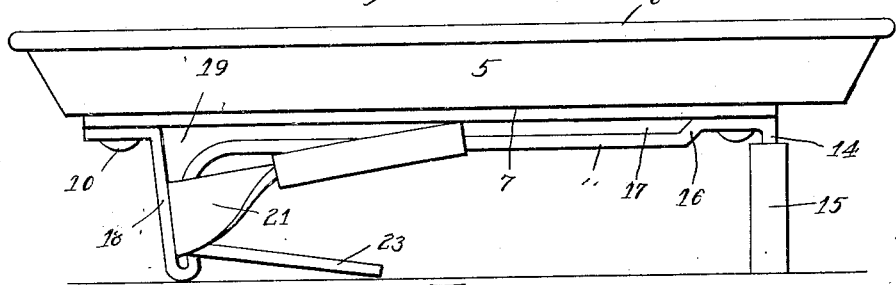
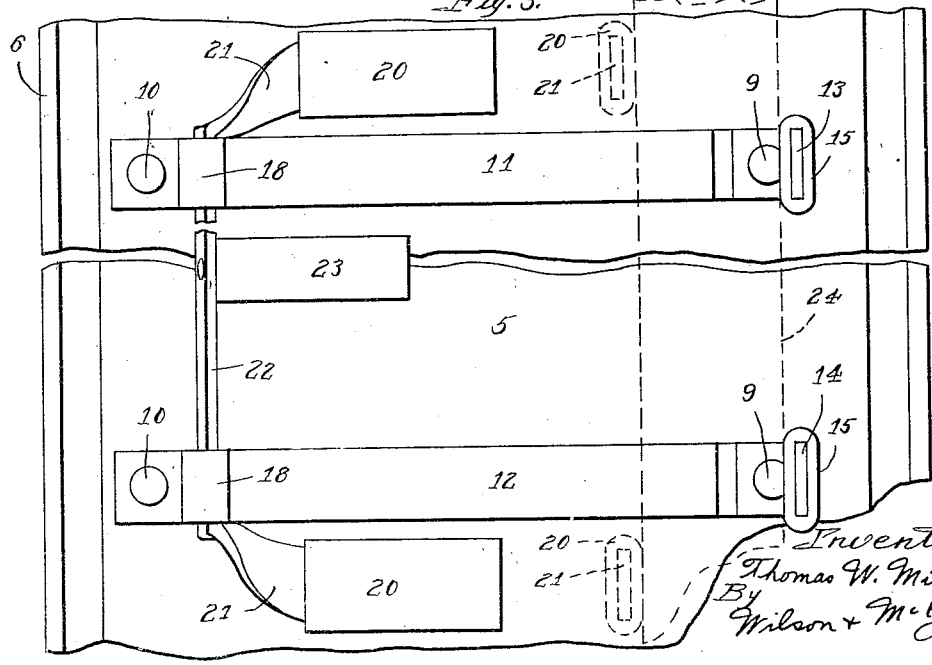

Patented Mar. 22, 1932

1,850,599

UNITED STATES PATENT OFFICE

THOMAS W. MILNER, OF ROCKFORD, ILLINOIS, ASSIGNOR TO THE TRAY SERVICE COMPANY, OF DALLAS, TEXAS, A CORPORATION OF TEXAS

SERVICE TRAY

Application filed December 12, 1928. Serial No. 325,526.

My invention relates to service trays for use in service to the occupants of automobiles and the like from soda fountains, drug stores and similar business. It has now become quite customary for many such places to extend service to cars drawing up at the curb. The occupants remain in the car, and merely blow the horn. The clerk comes to the car, takes the orders, and returns with the goods desired. It is necessary that ice creams, sodas and the like be served upon a tray of some sort.

While trays for this general purpose have been manufactured and marketed in the past they have proved to be unsatisfactory because of their instability when attached. In all cases they have been attachable to the door or other convenient place on the car by means of a three point support two legs usually resting against one side of the door and a single brace being brought against the car door from the other side.

Such a construction is instable and a small amount of movement sidewise will cause the tray to tip over. Again if glasses or heavy objects are placed far out and near one corner a slight jar will cause the tray to upset. A still further objection to the trays is the difficulty with which the adjustments are made. It is readily evident that when the operator has loaded his tray with glasses of soda and attempts to operate the mechanism for attaching the tray, its operation must be smooth and even to prevent spilling of the liquid. The trays now in use, because of their unstable condition, are adjusted with some difficulty and cause considerable loss from spilled liquids.

The general object of the invention is to provide an improved service tray for automobile and curb service capable of being firmly attached to the side or door of an automobile or the like.

Other objects are to provide an easily operable mechanism which may be cheaply constructed having four spaced supporting legs two of which cooperate with a clamping rack to elevate the latter under the tray and two of which cooperate with said clamping rack to support the tray on an automobile.

Referring to the drawings—

Figure 1 is a section showing the tray attached to the door of an automobile;

Fig. 2 is an elevation of the tray showing the clamping rack in the folded or elevated position; and Fig. 3 is a bottom view of the tray showing the clamping rack in the folded position and in dotted lines are shown a car door and the position of the clamping arms against it.

The tray designated generally by 5 may be of any suitable or preferred construction. To the bottom of this tray two parallel reinforcing strips 7 and 8 are attached, lying closely against the bottom thereof. These strips serve to strengthen the bottom of the tray against deflections due to the clamping rack. Mounted upon these reinforcing strips and attached to the tray by bolts 9 and 10 are the brackets 11 and 12 having ends 13 and 14 turned downward at right angles to the bottom of the tray. These ends form two legs of the tray and are covered by pads 15 of a resilient material which is used to prevent the metal from scratching or otherwise damaging the finish of the supporting member or door. A piece of soft rubber tubing drawn over the legs has been found to be very satisfactory. The bracket is so bent at 16 as to provide openings 17 between the main body of the bracket and the reinforcing strips. Near the ends where the bolts 10 hold the brackets, looped portions 18 are provided the loops being arranged to supply two legs of the tray. These looped portions of the brackets also serve to provide openings 19 joining with openings 17.

A clamping rack comprising two clamping arms 21 having coverings 20 of resilient material, a connecting bar 22 and a handle 23 attached to the latter, is supported in and adapted to move through the openings 17 and 19 between the position shown in Fig. 1 and that in Fig. 2. The clamping arms are somewhat longer than the legs 13 and 14 in order to serve as a bracing means as well as a clamping means. This is made necessary by the unbalanced manner in which the tray is clamped to the supporting door. The thickness of the bar 22 should be slightly less than the width of the opening 17 in order that the bar may slide freely therein. The service tray is placed upon the door 24 of a car or the like with one side thereof against the downturned legs 13 and 14 and the clamping arms 21 are brought against the other side of the door by means of the handle 23. The bar 22 is turned slightly in its opening 17 when in this position because the clamping arms are positioned to normally present an angle less than 90° with the plane of the opening as shown in dotted lines in Fig. 1 and therefore when brought to the vertical by contact with the side of the door it turns the bar 22 slightly, wedging it from slipping between strips 7 and 8 and brackets 11 and 12. The clamping rack is brought to the inactive position shown in Fig. 2 by drawing it back along the opening 17 until the bar 22 drops down into the opening 19, when clamping arms 21 are swung upward until the ends thereof are brought to a point near the bottom of the tray.

Those skilled in the art will observe that a service tray incorporating my invention possesses a number of novel and highly improved features. The tray rests firmly and securely on the door of an automobile or the like. This is attributable to the angle of the clamping arms, and the manner in which the tray clamps over the door, shown in dotted lines in Fig. 3, two pairs of oppositely acting members extending downward along the door to prevent the tray from upsetting. Fig. 2 shows the normal position in which the tray is loaded and carried. The operator, in approaching an automobile the occupants of which are to be served, rests the tray upon the door thereof and draws it outward until the legs 13 and 14 bear against the inner side of the door. The handle is then grasped and the clamping rack moved toward the door to the position shown in Fig. 1 the handle being urged forward bringing the clamping arms 21 firmly against the outer side of the door. This movement is freely and easily accomplished without danger of spilling the contents of glasses resting upon the tray. When the tray is thus placed it is difficult to disturb it without grasping the handle and loosening the clamping arms. When the tray is removed from the automobile the arms are again folded up above the legs and the tray will then rest evenly upon a flat surface.

While I have described the particular embodiment illustrated in detail, and described the invention in use with automobiles it is not so limited. It will be found useful for supporting trays upon chairs, railings, fences and innumerable other supports.

I am aware that numerous alterations and changes may be made in my construction without departing materially from the invention and I do not wish to be limited except by the spirit thereof and the appended claims.

I claim:

1. A serving tray for automobiles and the like having two pairs of downwardly projecting legs, metallic means on the bottom of said tray providing a guiding space between the two pairs, a clamping bar movable in said space toward and from the support upon which the tray is to rest and having slight rocking movement in said space, and clamping arms secured to the ends of said bar and adjustable with respect to one pair of legs and cooperating therewith in supporting the tray upon automobiles.

2. A serving tray for automobiles and the like having two pairs of downwardly projecting legs, metal strips attached to the bottom of the tray and spaced therefrom, a clamping bar movable in said space and having slight rocking movement therein, and having secured to its ends clamping arms adapted to take either a folded position under the tray or by the wedging action resulting from the rocking movement of said bar, an extended position cooperating with a pair of said legs to support the tray securely upon automobiles.

3. A serving tray for automobiles and the like having four legs connected in two pairs by means of metal strips attached to the bottom of the tray and spaced therefrom, a rocking bar carrying an arm at each end bodily movable in said space which latter is of such contour that the movement of the bar in said space will rock the arms carried thereby from a folded position under the tray to an operative position cooperating with two of said spaced legs to support the tray upon the door of an automobile or the like.

4. A serving tray for automobiles and the like comprising an article supporting tray, metal strips attached to the bottom thereof having one end of each turned downward at right angles thereto to form end supports, a downwardly extending loop adjacent to the other end thereof, said metal strips being spaced from the bottom of said tray to permit the movement of a clamping bar therebetween, and a slidable clamping bar positioned between said metal strips and said tray having downwardly turned arms adapted to cooperate with said end supports to engage the sides of an automobile door, the former being held thereto by the wedging of said slidable clamping bar between said tray and said metal strips.

5. The combination in a service tray adapted to be mounted upon a vertical support, said tray having comparatively short legs whereby it may be seated upon a flat surface in substantially level position, said legs being provided by a pair of bars secured to the under side of the tray and having downwardly turned portions, the intermediate portions of said bars being spaced from the bottom of the tray to provide guides, said tray being adapted to be hooked over the edge of a vertical support and a brace member having means engaging said spaced portions whereby it is shiftable on the under side of the tray toward and from said vertical support, said brace being adapted to be extended below the legs or collapsed to a position above the lower ends thereof and means defining slots at ends of said spaced portions into which the brace may be engaged to hold the brace collapsed.

6. The combination in a service tray adapted to be attached to a vertical support, of a pair of bars secured to the under side of the tray and formed with downwardly turned portions providing legs and intermediate portions spaced from the under side of the tray providing guides, said tray being adapted to be hooked over a vertical support, and a brace member shiftably mounted upon said intermediate portions for movement toward and from the side of a vertical support, said brace member in operative position extending below said legs, and means defining slots at ends of said intermediate portions to so receive the brace as to hold it in a collapsed position above the lower ends of the legs.

7. The combination in a service tray adapted to be attached to a vertical support, of a pair of bars secured to the under side of the tray and formed with downwardly turned portions providing legs and intermediate portions spaced from the under side of the tray providing guides, said tray being adapted to be hooked over a vertical support, and a brace member shiftably mounted upon said intermediate portions for movement toward and from the side of a vertical support.

8. The combination with a service tray having comparatively short legs and adapted to be hooked over a vertical support of a guide means on the under side of the tray defining a slot and a brace member shiftable in said slot toward and from the side of a vertical support upon which said tray is hooked, an end of said slot being directed downwardly at an angle to receive said brace and hold it in a position in which it is folded under the tray above the lower ends of said legs.

9. The combination in a service tray of means for hooking said tray over a vertical support, a pair of guides secured on the under side of the tray in spaced relation, a cross bar spanning said guides and having means embracing said guides whereby said bar is slidably retained upon said guides for movement toward and from a vertical support upon which the tray is hooked and brace means carried by said cross bar and operable into engagement with the side of said vertical support.

In witness of the foregoing I affix my signature.

THOMAS W. MILNER.